US012792608B1

(12) United States Patent
Kuentz et al.

(10) Patent No.: US 12,792,608 B1
(45) Date of Patent: Nov. 10, 2026

(54) MOBILE APPLICATION DATA COLLECTION FOR OBSERVABILITY

(71) Applicant: Amazon Technologies, Inc., Seattle, WA (US)

(72) Inventors: Chase H Kuentz, Volente, TX (US); Sagar Kailash Seth, Leander, TX (US); Aman Mishra, Pflugerville, TX (US); Shweta Subramani, Leander, TX (US); Joseph Cantu, Austin, TX (US); Schell Beatrix Carpenter, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/094,392

(22) Filed: Mar. 28, 2025

(51) Int. Cl.
*G06F 16/2455* (2019.01)
*G06F 16/21* (2019.01)
*H04W 24/10* (2009.01)

(52) U.S. Cl.
CPC ...... *G06F 16/24556* (2019.01); *G06F 16/211* (2019.01); *H04W 24/10* (2013.01)

(58) Field of Classification Search
CPC . G06F 16/24556; G06F 16/211; H04W 24/10
USPC ................ 707/692, 741, 756, 776, 803, 812
See application file for complete search history.

(56) References Cited

U.S. PATENT DOCUMENTS

| | | | | |
|---|---|---|---|---|
| 9,959,513 | B2 * | 5/2018 | Borodow | G06Q 10/06 |
| 10,015,629 | B2 * | 7/2018 | Pradeep | H04L 67/306 |
| 2015/0084757 | A1 * | 3/2015 | Annibale | H04W 4/90 340/436 |
| 2020/0372568 | A1 * | 11/2020 | Allen | H04W 4/60 |

* cited by examiner

*Primary Examiner* — Phong H Nguyen
(74) *Attorney, Agent, or Firm* — Kilpatrick Townsend & Stockton LLP

(57) ABSTRACT

Techniques are described for data analytics. An example method can include accessing, via the streaming gateway, a streaming message comprising the first event information from the event monitoring tool integrated with the mobile application instance. The method can further include processing the first event information to derive an attribute of the first event information. The method can further include generate an aggregated attribute based at least in part on the attribute and a second attribute collected from a second mobile application instance executing on a second mobile device. The method can further include storing the aggregated attribute in a database.

20 Claims, 15 Drawing Sheets

800

1000

| Event | Instrumentation Component | Use Case | Description |
|---|---|---|---|
| Glance View 1002 | Widget 1004 | Offers in View Port 1006 | A glance view event is logged when a list item fully enters the view port. Glance views are binary per data load. Multiple glance views are not marked if the user scrolls up and down several times. So in other words, a glance view answers the question "Did the user see the list item after loading the list?". |
| Dwell | LostWidget | Offer in Dwell Time | A dwell event is logged when a user "dwelled" on a list. Dwelling is when a list is not moving. The event is logged when the dwelling stops (e.g. user starts scrolling, or the list loses focus). A dwell event is logged for each list item in the view port. There is no deduping on dwell time, as it will be useful for the back end to accumulate total dwell times.<br>**Other Conditions:**- If dwelling occurs for more than 120 seconds, observability service will ignore the event and will reset once the list moves again or reloads. |
| Click | Widget | Offer Clicks | A click event is logged when a user clicks on a widget. Clicks should be deduped per load. |
| LogCount | Screen | Shadow mode log count | A LogCount event is emitted when the library is in Shadow Mode, and the current instrumentedscreen is losing focus. The number of times logEvent was called and the duration is logged aspart of this event. |

FIG. 10

1200

| Mode | Description |
| --- | --- |
| Off | Any logging instrumentation or calls to emit metrics are no-ops. |
| On | All logging instrumentation is turned on and logs are emitted off the device |
| Shadow | All logging instrumentation is turned on, but the library emits aggregated details of events like log counts per page load. |

FIG. 12

1300

| Component | Description | Contextual Attributes | Observability Events |
|---|---|---|---|
| Glance View | Top level contextual component. Provides session data about the user. These are global attributes, shared by all events | UserId<br>Application<br>ApplicationVersion<br>locationID<br>Area | None |
| Dwell | Provide screen level context | Context | LogCount |
| Click 1302 | Provide View level context (appended to screen context) and associated events 1304 | Context<br>Type [event attribute]<br>Id [event attribute] 1306 | DwellTime 1308 |
| LogCount | Widget level instrumentation for click and glance view impressions | Context<br>Type [event attribute]<br>Id [event attribute] | Click<br>GlanceView |

FIG. 13

MOBILE APPLICATION DATA COLLECTION FOR OBSERVABILITY

BACKGROUND

A computing system that is configured for data analytics can process, analyze, and interpret large volumes of structured and unstructured data to extract meaningful insights and support decision-making. The computing system can use process information to draw insights that are represented by data visualization tools. These capabilities can be useful in various applications, where actionable insights derived from data analytics drive innovation, optimize operations, and enhance competitive advantage.

BRIEF DESCRIPTION OF THE DRAWINGS

Various embodiments in accordance with the present disclosure will be described with reference to the drawings, in which:

FIG. 10 is an illustration of an example table of observability concepts, according to one or more embodiments;

FIG. 12 is an illustration of an example table of logging strategy, according to or more embodiments;

FIG. 13 is an illustration of a table describing various components, according to one or more movements;

DETAILED DESCRIPTION

Figure 1:
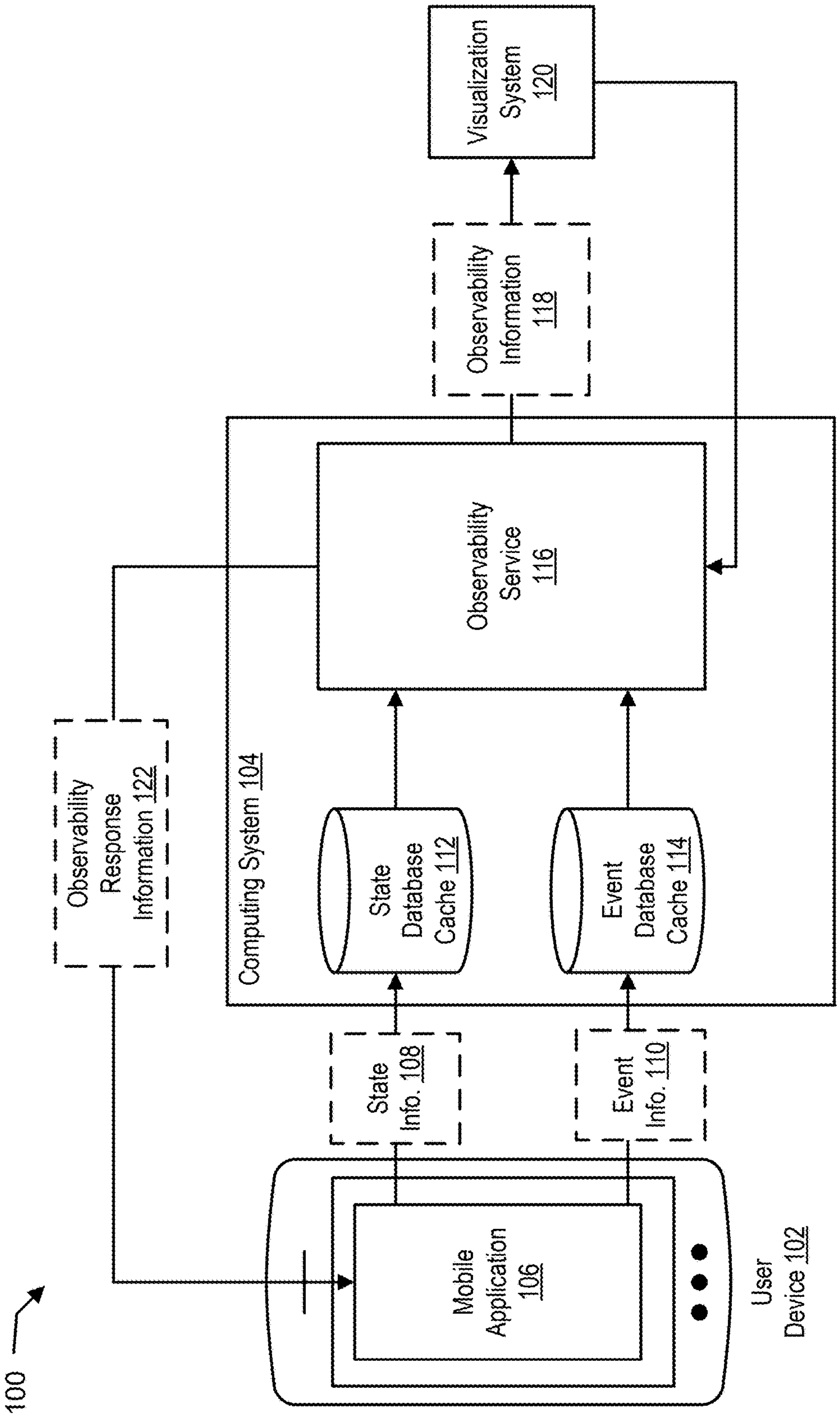
FIG. 1 is an illustration of an example system for streaming information, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The herein described embodiments include a computing system that can be configured for data analytics on information collected from a group of devices (e.g., smartphones, laptops, or other devices) that are each executing the same application. Each device in the group can execute the application instance and generate information corresponding to, for example, user interface (UI) interactions, application states, and device-specific parameters, such as network conditions, battery levels, and processing loads. The computing system can collect this information from each device in real-time or near-real-time. The computing system can then process the information using analytics techniques, including correlation algorithms, to identify patterns, anomalies, and trends across the group of devices. This information can provide real-time insights into the current state of a computing network.

As an example, consider a service application that allows users to view and accept job opportunities. Service application instances can be respectively downloaded on a group of smartphones. Each mobile application can collect information based on interactions with the application. The mobile applications can transmit this information to a central server, which can analyze the information for insights into the state of the mobile application as a whole. Therefore, each mobile application instance can generate a portion of information that can be aggregated and analyzed by the computing system to determine a state of mobile applications and smartphones as a whole. This insight can be utilized by an entity managing the mobile application to troubleshoot errors in real time and improve the efficiency of the service.

Conventional systems that are configured for data analytics can rely on imperative implementation of processes for data collection and analysis. Imperative implementation can include a programming technique in which developers explicitly define how a program should execute step by step to achieve a desired outcome. For example, developers may manually specify points within a code as to which events to identify and what data is to be analyzed. This conventional imperative implementation approach can be labor-intensive, prone to code errors, and difficult to scale, particularly when the collection of information from multiple devices is required. Querying data can require manual formulation of queries and an in-depth understanding of the underlying dataset, often resulting in slow and non-real-time analysis when working with large-scale datasets. Furthermore, data correlation and deciphering can necessitate complex, manual processes to extract meaningful insights, adding significant overhead to data analytics workflows.

The embodiments herein address the above-described challenges. The embodiments herein describe an end-to-end observability service that can be integrated with various applications for collecting and processing information from groups of devices. Rather than manually coding which events and states to observe, the embodiments herein describe techniques for configuring a computing system to collect desired event information (e.g., clicks, glances, and other events), and without manually specifying events in the code. The observability service can further be configured for real time collection of information from each device of a group of devices.

The embodiments herein offer several technical advantages over conventional systems. Conventional systems can use inline invocations of application programming interfaces (APIs) that may include explicit parameter input for a particular action. The herein described techniques include configurable metrics that can be provided to a logging tool via configuration information. The herein described embodiments can be implemented by more light weight code and less reliance on explicit instructions in the code. Conventional systems may further rely on batch data transmission which can result in increased latency. The herein described techniques can include the transmission of streaming information, such that the information can be processed in real-time with lower latency compared to conventional systems.

FIG. 1 is an illustration 100 of an example system for streaming data analytics, according to one or more embodiments. As illustrated, a user device 102 (e.g., mobile device, laptop, or other user device) can be in communication with a computing system 104 (e.g., server, mainframe, or other computing system) The computing system 104 can further be in communication with a visualization system 120 (e.g., computing device or computing system operable to display data visualizations). The computing system 104 can be configured to facilitate real-time event monitoring, data aggregation, and data analytics.

It should be appreciated that the embodiments herein are described with respect to collecting information from an application (e.g., mobile application 106). The application can be configured for an end-user task (e.g., providing an interface for viewing and accepting job opportunities). One having ordinary skill in the art can contemplate that the embodiments herein can be with respect to collecting information from another entity, such as a service. For example, the service can be a background process that is configured to perform a function. For example, the service can be a database service for storing information from multiple sources to a data center.

The user device 102 can execute a mobile application 106. For example, a mobile application 106 that can include an interface for viewing and accepting service contracts. In some instances, a user can use the interface to interact with the mobile application 106. The mobile application 106 can be integrated with software for monitoring the application and collecting telemetry information based on the interactions. As illustrated, the telemetry information can be state information 108 or event information 110. State information 108 can include, for example, static information that represents a current status or configuration of the mobile application 106. This can include a mobile application setting (e.g., active mode, sleep mode, or other setting), a mobile application configuration (e.g., which widgets are currently displayed, what page is being displayed, and/or other configuration or settings). The state information 108 can also include network information (e.g., communication protocol, such as Wi-Fi, cellular or other protocol, network connectivity strength, or other network information) that may be affecting the performance of the mobile application 106. The event information 110 can include, for example, interactions with the mobile application 106, For example, the interactions can include interactions with interactive elements, such as widgets, sliders, buttons or other interactive elements. The event information 110 can also include occurrences with the mobile application 106. The occurrences can include, for example, a length of time spent at a page accessible by the application, a switch from one communication protocol to another communication protocol (e.g., Wi-Fi to cellular, $5^{th}$ generation (5G) to long term evolution (LTE) 4G or other switch in communication protocol), mobile application crashes, or other occurrences.

In some embodiments, the mobile application 106 can be integrated with a logging tool. As described with respect to FIG. 2, the logging tool can be configured to monitor specific types of state information 108 and event information 110. In some instances, the logging tool can be native to the mobile application 107, such that the logging tool has been integrated with the mobile application 106 prior to being installed onto the user device 102. In other instance, the logging tool can be integrated with the mobile application 106 via a software update of the mobile application 106. For example, the computing system can transmit to the user device 102 configuration information for a software developer kit (SDK). The SDK can include instrumentation information for an event type. The configuration information can indicate a mobile application component to be accessed for collecting event information having the event type, wherein the event information is accessed based at least in part on the event type and the mobile application component. The logging tool can collect the state information 108 and event information 110 from the mobile application 106. As illustrated this information can be transmitted to the computing system 104.

The user device 102 can stream the state information 108 and event information 110 to the computing system 104. For example, in some instances, the computing system can configure a streaming gateway as an intermediary between the user device 102 and the computing system 104. The streaming gateway can include software that manages the buffering, routing, and formatting of information transmitted between the user device 102 and the computing system 104. The streaming gateway can enable real-time transmission of information from the user device 102 to the computing system 104, For example, the logging tool can collect information indicating that a widget has been clicked. Rather than storing this information in a batch and transmitting a batch of information, the user device 102 can transmit the information 108 to the computing system 104 upon collection by the logging tool. As further discussed below, by providing the information to the computing system 104 in real time, the computing system 104 can process and analyze state information 108 and event information 110 in real-time.

At the computing system 104, the state information 108 can be stored in a state database cache 112, while the event information 110 can be stored in an event database cache 114. These caches can serve as temporary storage locations for the collected data, enabling efficient access and processing by the computing system 104.

Figure 2:
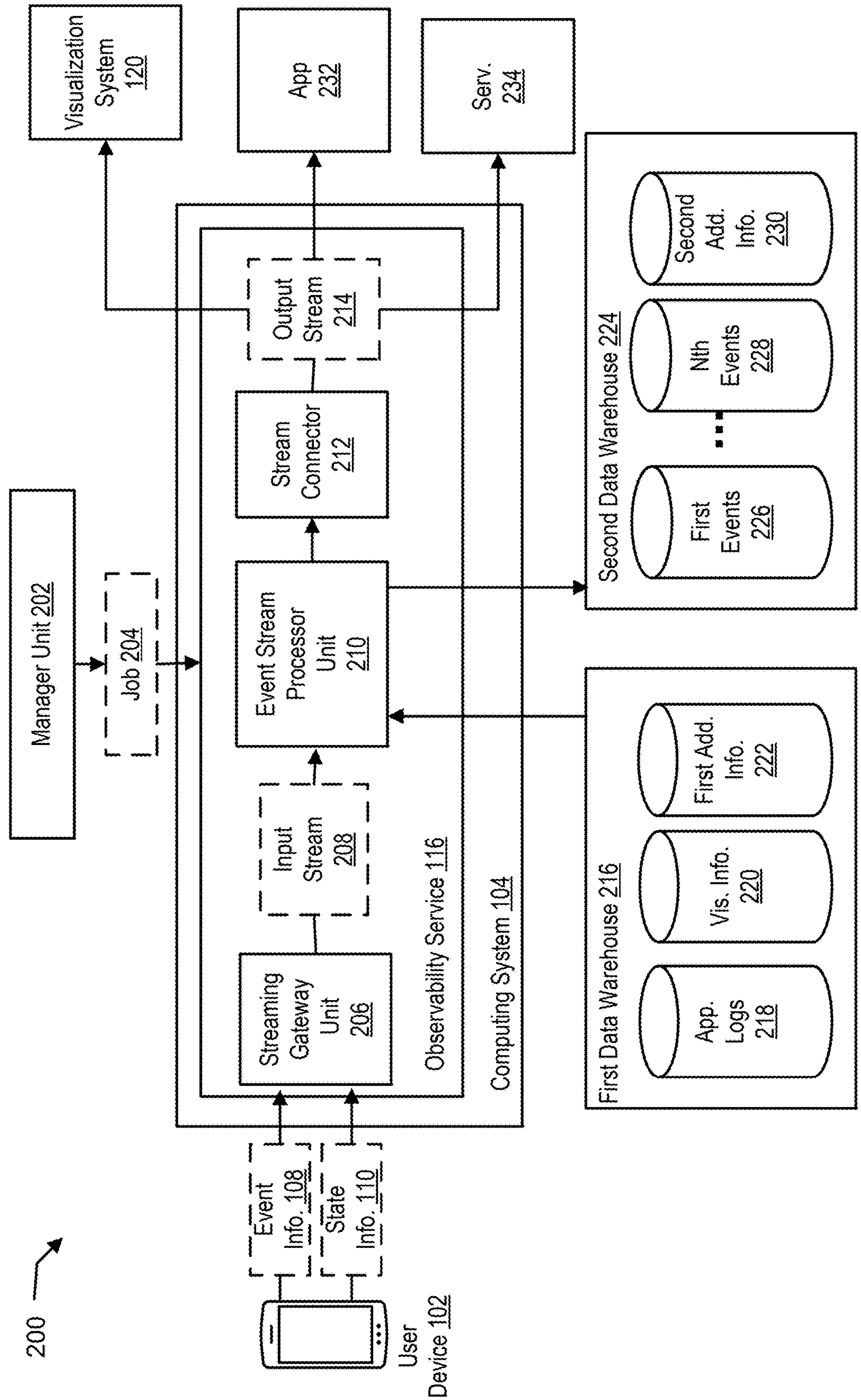
FIG. 2 is an illustration of an example system for processing information, according to one or more embodiments.

The computing system 104 can include an observability service 116, which is operable to process the stored state and event information to generate observability information 118, The observability service 116 is described with respect to FIG. 2. As used herein observability can include the consumption of external inputs, such as logs, metrics, traces, to better understand a computing system. The observability service 116 can analyze a data set, such as a data set of state information 108 and event information 110 and identify individual components to determine why a target computing system is in a particular state. A component can be a representation of attributes. Components can instrument native mobile application components such as view controllers, activities, views, or other native components for granular contextual definitions. From an implementation perspective, a component can be any medium, class, interface, annotation, or other representation of an attribute.

The observability service 116 can process information from various sources for determining a cause of a target computing system state. For example, the observability service 116 can collect information from a front end, such as click stream information (e.g., a record of mobile application activity, or other click stream information) and back end information, such as network connectivity. The observability service 116 can, for example offer insights based on these various sources for debugging the target computing system's state. Referring back to the example above, the mobile application 106 can be an instance of a service application that includes an interface for providing job opportunities (e.g., driving a package from one location to another location or other job opportunity) and allowing users to accept the opportunities. Furthermore, the service application may be used by hundreds or thousands of users at any given time. The observability service 116 can collect front end information, such as a number of clicks accepting the job opportunities in real time via streaming information. The observability service 116 can also process the information and determine a downturn in the number of job opportunities accepted, in addition to the front end information, the observability service 116 can collect back end information, such as network connectivity information that indicate slow network service. The observability service 116 can determine that the downturn in accepted job opportunities may be attributable to the slow network service.

The observability service 116 can output observability information 118 to a visualization system 120. The observability information 118 can include information and one or more attributes that provide insight into the information. Returning to the example above, the observability information 118 can include information indicating the downturn in job opportunities accepted. In some embodiments, this information may be formatted by presentation by a visualization system. For example, the observability information 118 may be formatted to be presented as a chart of job opportunities accepted against time. Again, returning to the example above, the observability information 118 can also include network connectivity information indicating slow network service. In addition to these instances of information, the observability information 118 can include one or more attribute instances of information. For example, the observability information 118 can include an indication of the downturn in job opportunities accepted with the slow network service.

The visualization system 120 can be a computing system that is configured to execute software for visualization and querying of information. For example, the visualization system can be operable for a structured query language (SQL) querying and manipulating information stored in the computing system 104. The herein described techniques can be assistive for determining a cause for a target computing system state. For example, a query may request information with respect to job opportunity acceptances. However, query may not include a request for network connectivity information. The visualization system 120 can query the computing system 104 for the job opportunity acceptance information, and the computing system 104 can return the job opportunity acceptance information and the attribution to the slow network service without a request for the network connectivity information, in some embodiments, a response from the computing system 104 to the visualization system 120 may further include the network connectivity information. In other embodiments, the visualization system 120 may request the network connectivity information prior to the computing system 104 providing said information. The visualization system 120 can render graphical representations of the collected attributes, allowing users to identify trends, patterns, and correlations in the information.

In some instances, the visualization system 120 can generate and transmit a message to the observability service 116. The message can include information to be used to generate observability response information 122. For example, the message can include information to be used to update some aspect of the mobile application 106 or the user device 106. The observability service 116 can use the information to generate the observability response information 122, which is transmitted back to the user device 102. The observability response information 122 can be configured to change the state of the target computing system (e.g., user device 102 including hardware and software). As illustrated, the observability response information 122 can be used to configure the mobile application 106. For example, the observability response information 122 can include configuration information for the logging tool (e.g., collect different types of information, collect information at a different frequency, or other configuration information). In another example, the observability response information 122 can include a software update for the mobile application 106. Returning to the example above, the observability response information 122 can include instructions for increasing the transmission power of the user device 102 to account for the slow network service.

FIG. 2 is an illustration 200 of an example system for processing information, according to one or more embodiments. In some embodiments, a logging tool integrated with the mobile application 106 can be configured to collect particular types of state information 108 or event information 110. For example, the computing system 104 can be in communication with a manager unit 202. The manager unit 202 can be configured to provide a job 204 to the observability service 116. The job 204 can include a schema that indicates the types of state information 108 and event information 110 to be collected. In some embodiments, the schema can be accessed via a metadata service. Returning to the example above, the schema can indicate, for example, instructions to collect information based on interactions with a first widget, but not information from interactions with another widget. As another example, the schema can indicate to collect information as to a time interval displaying a first page of the mobile application 106, but not for a time interval displaying a second page of the mobile application 106. Various other examples of types of state information 108 and event information 110 for collection can be contemplated by one having ordinary skill in the art.

The state information 108 and event information 110 streamed to the computing system 104 via the streaming gateway unit 206 can be based on the indication(s) in the job 204. As indicated above, the streaming gateway unit 206 can configure a streaming gateway to act as an intermediary for real-time data transmission from the user device 102 to the computing system 104. The streaming gateway unit 206 can manage the buffering, routing, and formatting of state information 108 and event information 110. Although not illustrated, the streaming gateway unit 206 can cause the state information 108 and event information 110 to be routed to a state database cache 112 and an event database cache 114. The state information 108 and event information 110 can be routed via an input stream 208 to the event stream processor unit 210. The event stream processor unit 210 can perform real-time processing of the state information 108 and the event information 110. For example, the event stream processor unit 210 can analyze, determine, and aggregate attributes derived from the collected information. The processed information can be passed to the stream connector 212, which can format and prepare the output (e.g., observability information 118) for transmission as an output stream 214 to a consumer of the output. As indicated in FIG. 1, the consumer can be a visualization system 120. The consumer can also be another entity. For example, the consumer can be an application 232 that uses the observability information 118. For example, the observability information can relate to a number of users that are accepting opportunities via the mobile application 106. The application 232 can be a scheduling application that can increase or decrease a number of virtual compute instances that are provisioned based on whether the number of accepted opportunities is increasing or decreasing. In another example, the consumer can be a service 234 that can use the observability information 118. For example, the service 234 can be a networking service that can use information such as network performance information to manage its operations.

As indicated above, the event stream processor unit 210 can process streaming information to generate observability information 118. In some embodiments, the event stream processor unit 210 can use batched information in addition to the streaming information. For example, the event stream processor unit 210 can access information stored in databases at a first data warehouse 216. The first data warehouse 216 can, for example, store batched application logs 218, batched visualization information 220, and additional information 222. The application logs 218 can include logs of information collected by a logging tool from mobile application instances. It should be appreciated that although a user device 102 is illustrated as executing a single mobile application 106, the computing system 104 is operable to collect state information 108 and event information 110 from multiple user devices that are each executing a mobile application instance, There can be various reasons why the application logs 218 are in batched format. For example, the application logs 218 can be historical information that was collected in the past. In instances of poor network connectivity, a mobile application may be configured to batch state information 108 and event information 110 rather than transmit the information via a streaming gateway. The user device 102 can then transmit the batched information to the computing system 104 after network connectivity improves. The event stream processor unit 210 can use the information from the first data warehouse to generate the observability information 118.

The event stream processor unit 210 can also output information to the second data warehouse 224, which can store, for example, first events 226 through the Nth events 228, and additional information 230. Therefore, in addition to transmitting the observability information 118 to the visualization system 120, the observability information can be stored in the second data warehouse 224. In some embodiments, the information stored in the second data warehouse 224 can be copied and stored in the first data warehouse 216. This information can then be used by the event stream processor unit 210 to analyze the state information 108 and the event information 110. The event stream processor unit 210 can use the information as context for the analysis. For example, the event stream processor unit 210 can use a previously determined attribute to determine an insight for real-time streaming information. In some embodiments, the information stored in the second data warehouse 224 can be partitioned information.

Figure 3:
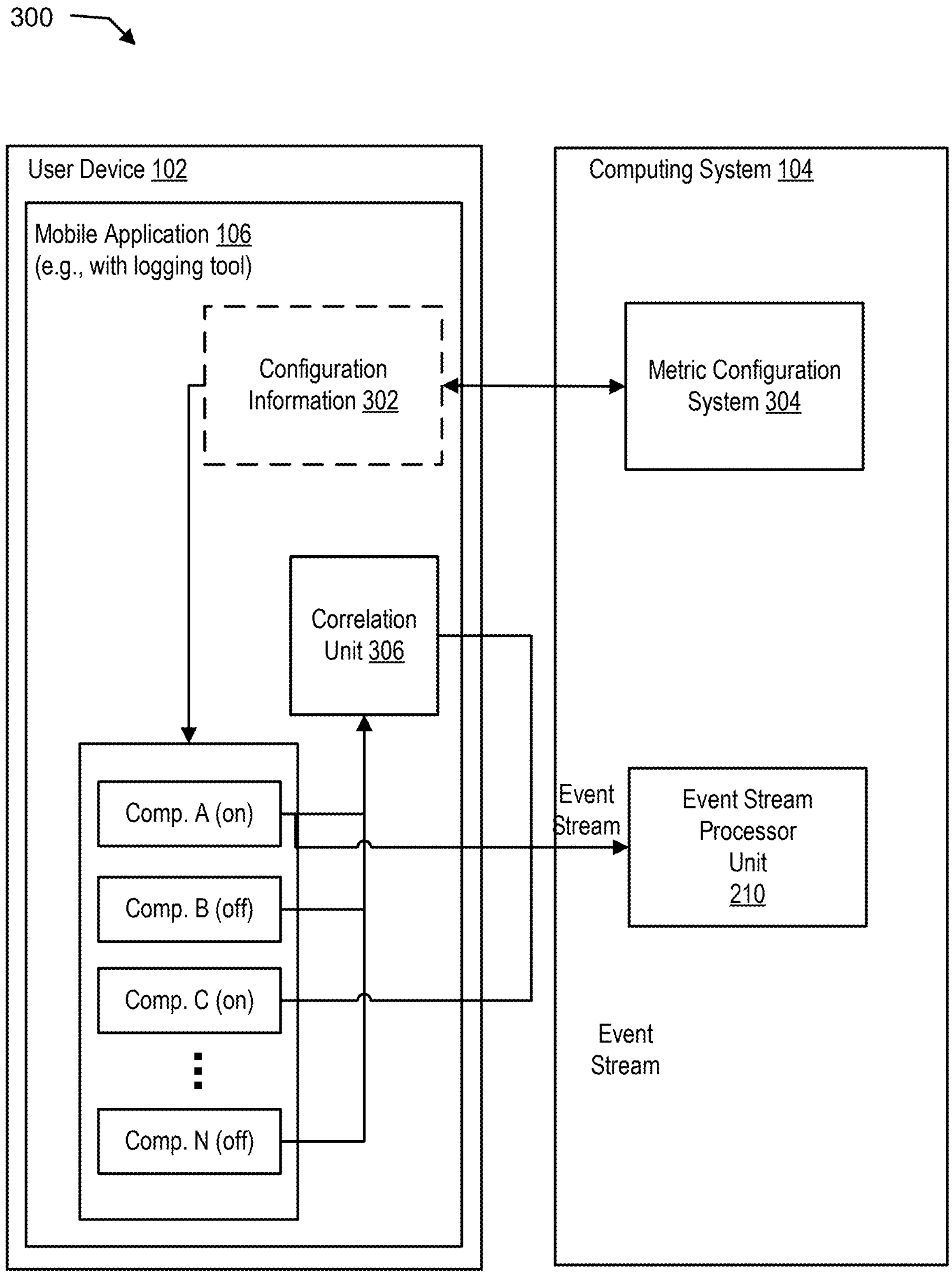
FIG. 3 is an illustration of an example system for configuration instrumentation, according to one or more embodiments.

The visualization system 120 can receive the output stream 214 (e.g., observability information 118) from the computing system 104 and render a graphical representation (e.g., charts, graphs, and dashboards) of the information. As indicated above, the visualization system 120 can support SQL-based querying and dynamic interaction, enabling users to refine queries, adjust schema parameters, and derive actionable insights. This can assist with state traceability for determining a state timeline, which can include the progression of a target computing system's state over time. For example, the graphical representations can be used to determine specific state changes (e.g., change in network connectivity or other state change);

FIG. 3 is an illustration 300 of an example system for configuration instrumentation, according to one or more embodiments. As illustrated, the user device 102 can execute a mobile application 106 that includes a logging tool. The mobile application can receive configuration information 302 from a metric configuration system 304. The configuration information 302 can indicate various components of the mobile application to monitor or to exclude from monitoring. A component can include, for example, widgets, session information, network information or other components associated with the mobile application 106. Therefore, even though each component can generate state information 108 or event information 110, the logging tool only collects information from the indicated components. As illustrated, the logging tool is configured to collect information from component A and component C, but not from component B or other components. The logging tool can adjust the event log levels, enabling the collection of additional details about the monitored events when necessary (e.g., capturing detailed metadata about page transitions or network connectivity changes or other events).

The correlation unit 306 can process the collected information and correlate related events to generate complex derived events. For example, this can include tracking workflows, such as "page transition" events, and calculating metrics like the time elapsed between specific interactions (e.g., scheduling an offer). For example, the correlation unit 306 can aggregate information from component A and component C to identify patterns, such as user navigation through the application interface or delays in completing core workflows. This correlated information along with the information from component A and component C can then be transmitted as an event stream to the event stream processor unit 210, enabling downstream analytics and visualization.

Figure 4:
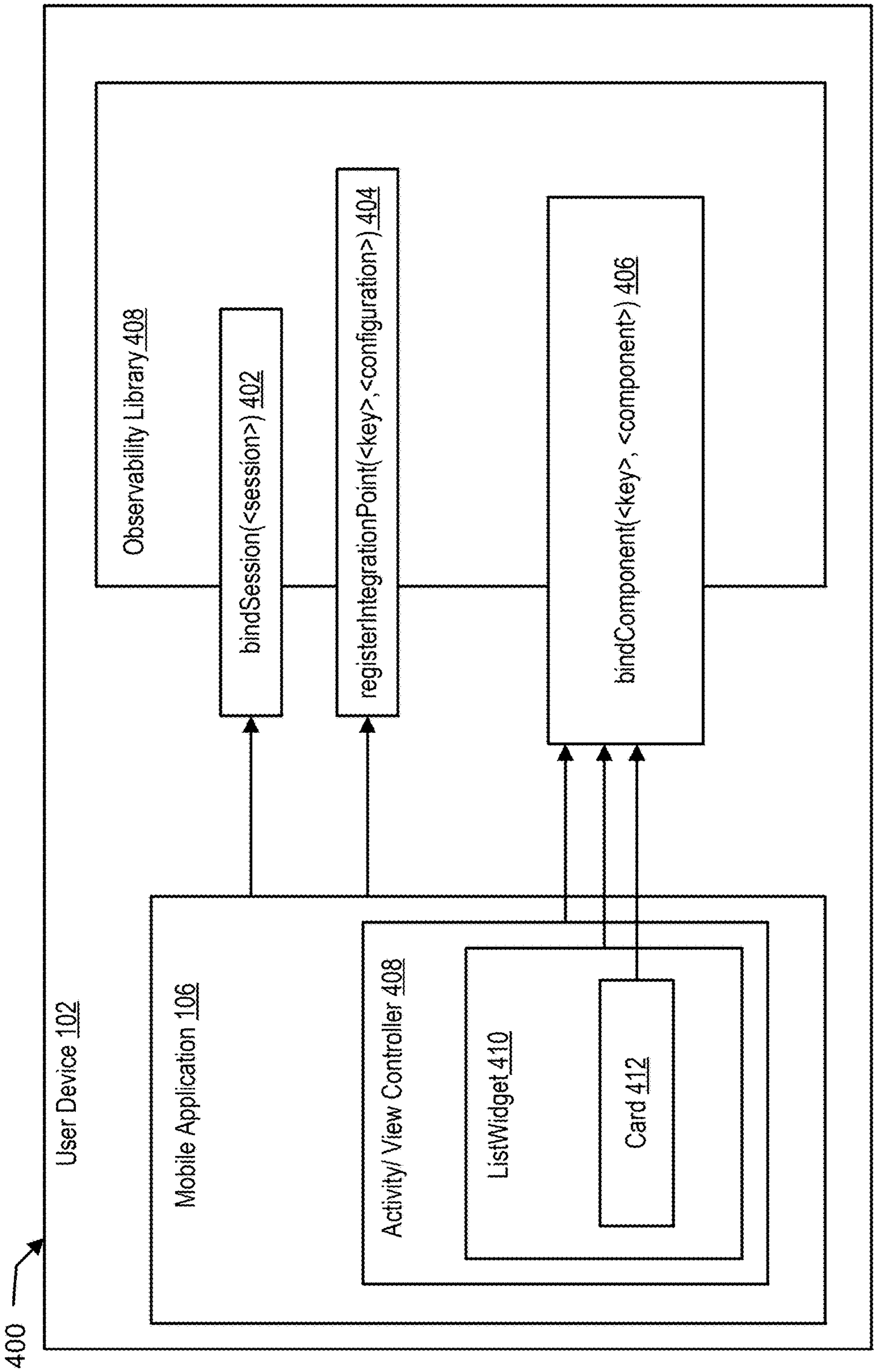
FIG. 4 is an illustration of an example system for component registration, according to one or more embodiments.
Figure 5:
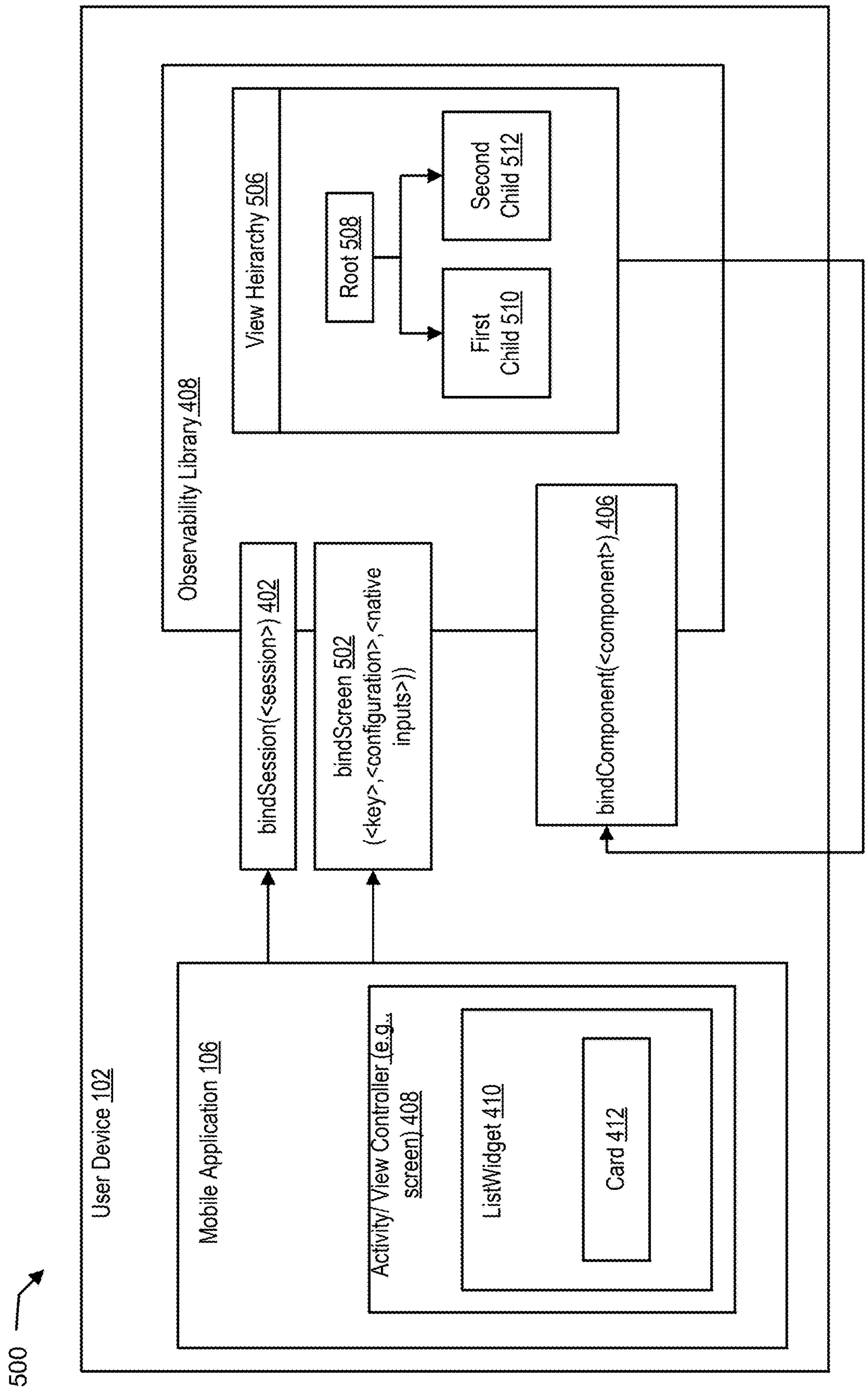
FIG. 5 is an illustration of an example system for automated component registration, according to one or more embodiments.
Figure 6:
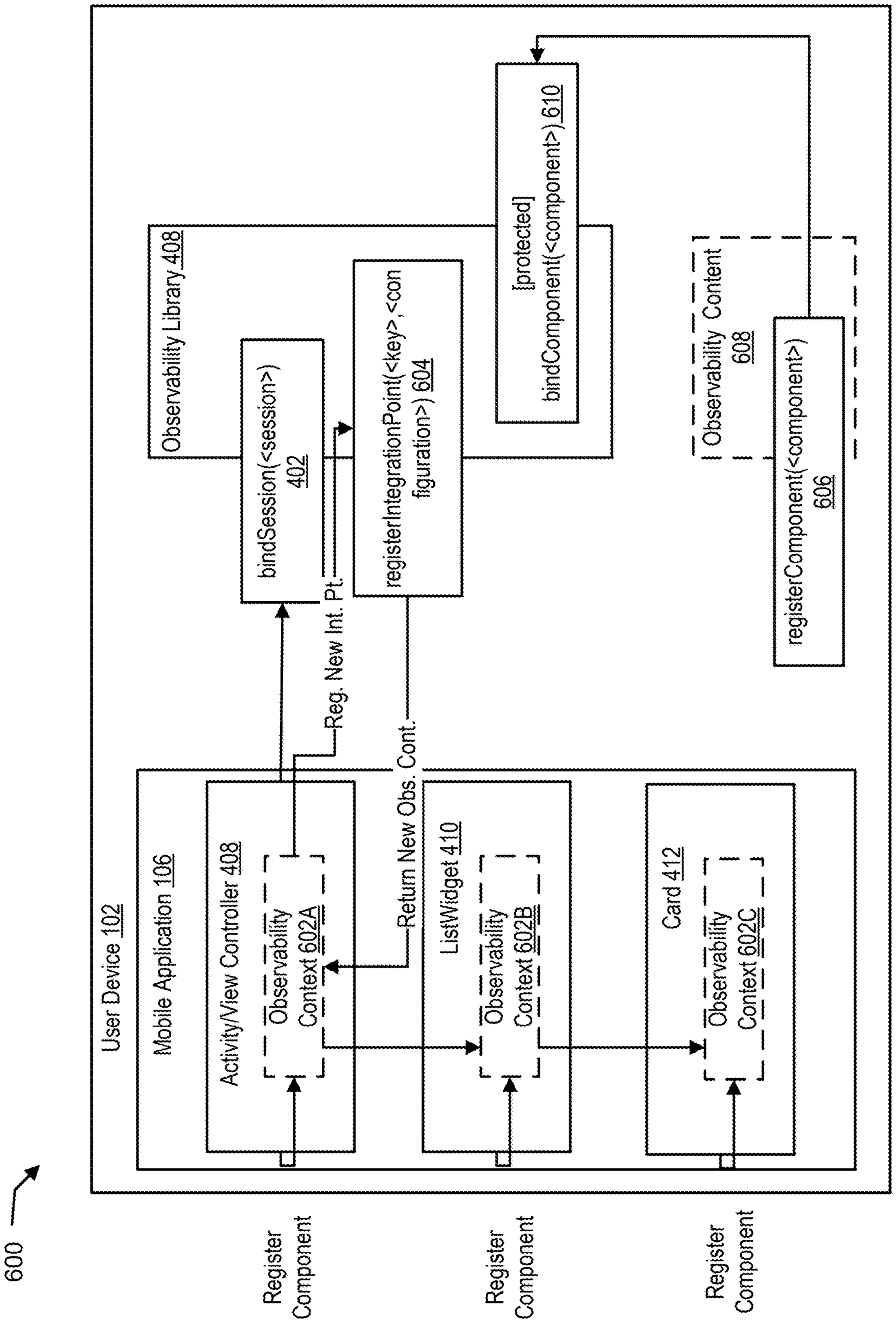
FIG. 6 is an illustration of an example system for context-based component registration, according to one or more embodiments.

FIGS. 4, 5, and 6 are provided to illustrate techniques for registering components.

FIG. 4 is an illustration 400 of an example system for component registration, according to one or more embodiments. An application programming interface (API)-based system architecture is illustrated for registration of components and integration points to facilitate the collection of state information 108 and event information 110. The user device 102 can use a set of APIs (e.g., bindSession 402, registerIntegrationPoint 404, and bindComponent 406) from an observability library 408 for registering components of the mobile application 106. As described herein to collect state information 108 or event information 110 from a component, the component can be registered for collection.

The user device 102 can execute the mobile application 106, which can include multiple components such as an activity/view controller 408, ListWidgets 410, and card 412, These components generate state information 108 and event information 110. The user device 102 can use APIs for registration of the components. For example, bindSession 402 can be used to establish a session between the user device 102 and the computing system 104 for collecting information from the mobile application 106. Additionally, registerIntegrationPoint 404 can be used to register specific integration points within the mobile application 106 to link components to an observability information collection session. Furthermore, bindComponent 406 can be used to associate child components (e.g., cards, or ListWidgets) with their parent components (e.g., activity/view controller 408).

FIG. 5 is an illustration 500 of an example system for automated component registration, according to one or more embodiments. The user device 102 can use a set of APIs (e.g., bindSession 402, bindScreen 502, and bindComponent 406) from an observability library 408 for automated registration of the components. The user device 102 can execute the mobile application 106, which can include multiple components such as an activity/view controller 408, ListWidgets 410, and card 412 (informational disclaimer).

As indicated above, bindSession 402 can be used to establish a session between the user device 102 and the computing system 104 for collecting information from the mobile application 106. The mobile application 106 can include a screen component 408, which can be bound to an integration point via the bindScreen API 502. An integration point can be for example an address, a uniform resource locator (URL) or other point at the observability service 116 for collecting state information 108 and event information 110. The components within the mobile application 106 (e.g., ListWidgets and card) can automatically registered to the view hierarchy 506, which can include a hierarchical representation of the layout of the mobile application 106. The bindComponent 504 ensures that subcomponents auto-bound to the view hierarchy 506 are correctly associated with their respective parent nodes. Furthermore, the hierarchical structure of the view hierarchy 506 can cause the state information 108 event information 110 to be logically organized based on the layout of the mobile application 106.

FIG. 6 is an illustration 600 of an example system for context-based component registration, according to one or more embodiments. The user device 102 can execute a mobile application 106, which can include components, such as activity/view controller 408, ListWidget 410, and card 412. Each component can register itself for providing new observability context (e.g., 602A, 602B, and 602C). Observability context can include event information 108 and state information 110 from individual components. The observability context from each component can be combined to form the observability content 608.

As indicated above, bindSession 402 can be used to establish a session between the user device 102 and the computing system 104 for collecting information from the mobile application 106. Furthermore, the user device 102 can register integration points using an API (e.g. register-IntegrationPoint 604. Each component can register itself using and API (e.g., registerComponent 606. The user device 102 can further use a protected API (e.g., bindComponent 608) to manage the association of observability content 610 collected from the components with integration points.

Figure 7:
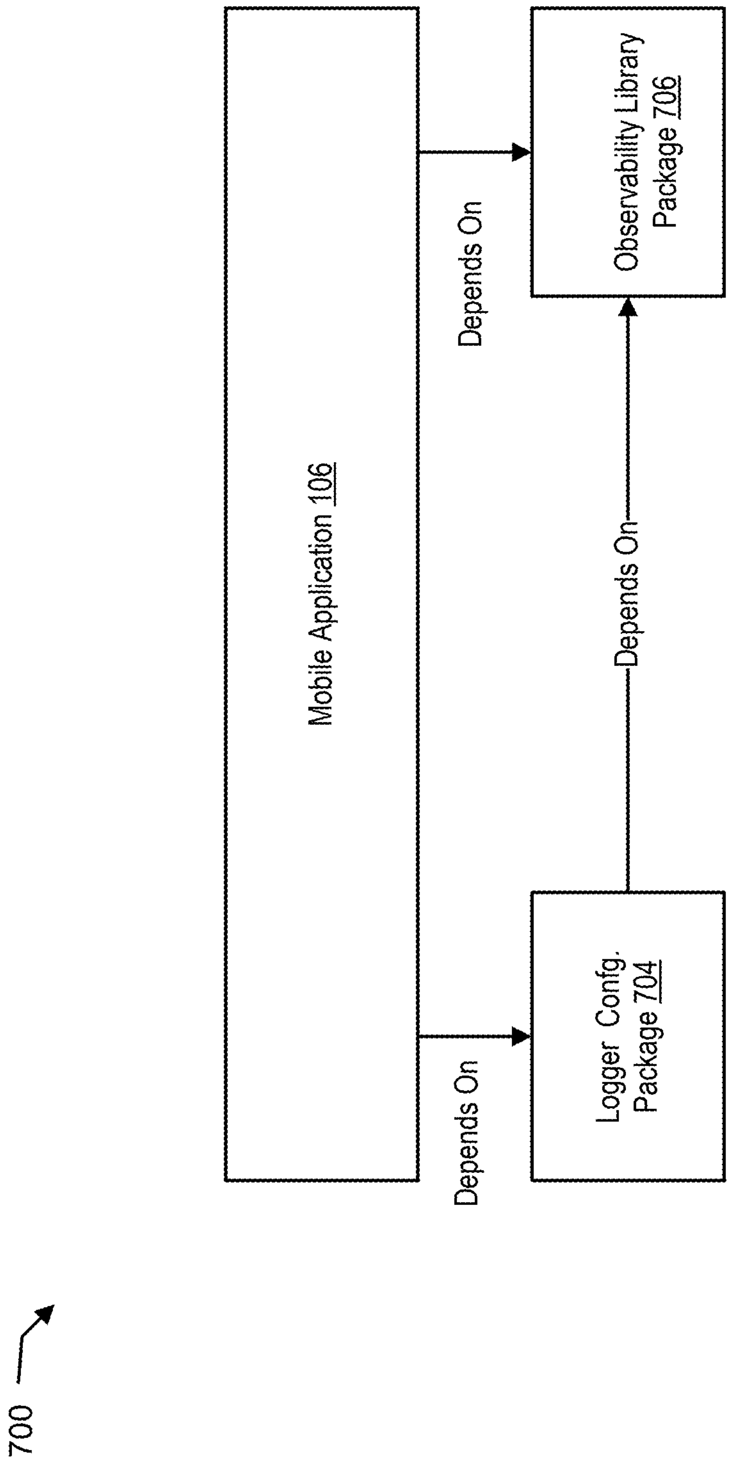
FIG. 7 is an illustration of an example technique for package configuration, according to one or more embodiments.
Figure 8:
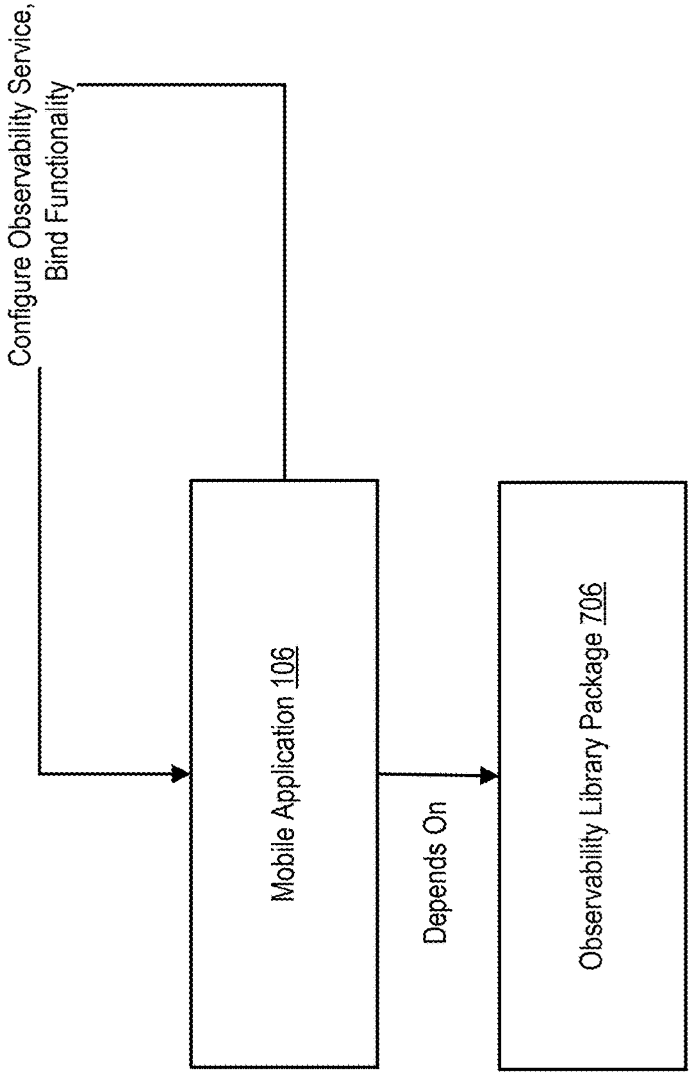
FIG. 8 is an illustration of an example technique for package configuration, according to one or more embodiments.
Figure 9:
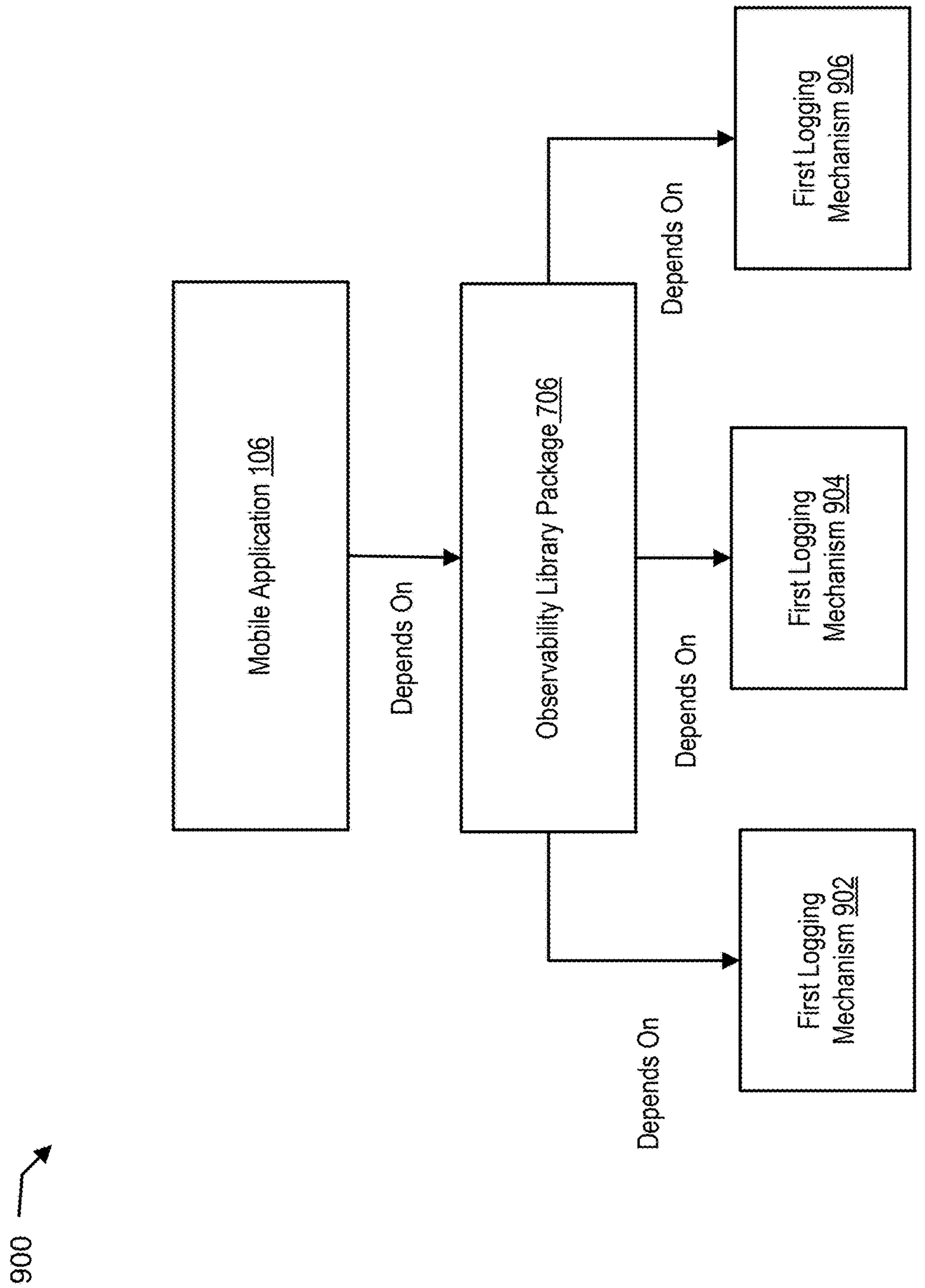
FIG. 9 is an illustration of an example technique for package configuration, according to one or more embodiments.

FIGS. 7, 8, and 9 are provided to describe different configuration techniques for the mobile application 106.

FIG. 7 is an illustration 700 of an example technique for package configuration, according to one or more embodiments. As illustrated the mobile application 106 can be a software application that includes each software element for registering a component, collecting state information 108 and event information 110.

In this embodiment, the user device 102 can use the configuration information to initialize the mobile application 106 for collecting state information 108 and event information 110. This approach can be used when configuring the logging tool requires significant setup. The configuration of the logging tool, the integration points for transmitting the state information 108 and event information 110 can be based on a logger configuration package 704 that is a part of the mobile application 106. Furthermore, the logger configuration package 704 can be based on the observability library package 706, which can include reusable code for configuring the logging tool. This approach allows the mobile application 106 to run independently of the observability service 116 if the mobile application 106 is self-contained. Furthermore, this approach enables minimum boilerplate for instantiation of the logging tool, and reduces the need for additional dependencies outside of the mobile application 106.

FIG. 8 is an illustration 800 of an example technique for package configuration, according to one or more embodiments. As illustrated the mobile application 106 can be a software application that includes each software element for registering a component, collecting state information 108 and event information 110.

In this embodiment, the user device 102 can initialize the mobile application 106 for collecting state information 108 and event information 110. This approach can be used if configuring the logging tool requires little setup. The configuration of the logging tool, the integration points for transmitting the state information 108 event information 110 state information 108 and event information 110 can be based on an observability library package 706. This approach minimizes the need for additional dependencies outside of the mobile application 106.

FIG. 9 is an illustration 900 of an example technique for package configuration, according to one or more embodiments. As illustrated the mobile application 106 can be a software application that includes each software element for registering a component, collecting state information 108 and event information 110.

In this embodiment, the user device 102 can initialize the mobile application 106 for collecting state information 108 and event information 110. The configuration of the logging tool, the integration points for transmitting the state information 108 and event information 110 can be based on an observability library package 706, which can include various logging mechanisms such as, a fist logging mechanism 902, (e.g., an application message broker), a second logging mechanism (e.g., application metrics), and a repository manager 906 for configuring the logging tool. In this approach, the observability library package 706 can include each element needed to be instantiated.

FIG. 10 is an illustration 1000 of an example table of observability concepts, according to one or more embodiments. For illustration purposes, the top row of the table is described. An event collected from a mobile application can include glance view 1004. This can include an indication that a page of the mobile application 106 remained on the mobile device screen for a period of time. The instrumentation component that was registered and used to collect the event information can include a widget. For example, a widget 1004 that was visible on the page. A use case for collecting this information can include determining offers in view port 1006. Returning to the example above, the mobile application 106 can be configured to display job opportunities (e.g., offers). The observability service 116 can be used to determine whether the job opportunity was viewed by a user. As indicated above, if the job opportunity was not viewed by the user, the observability service 116 can further process the collected information to generate observability information 118 that can explain why the job opportunity was not viewed.

Figure 11:
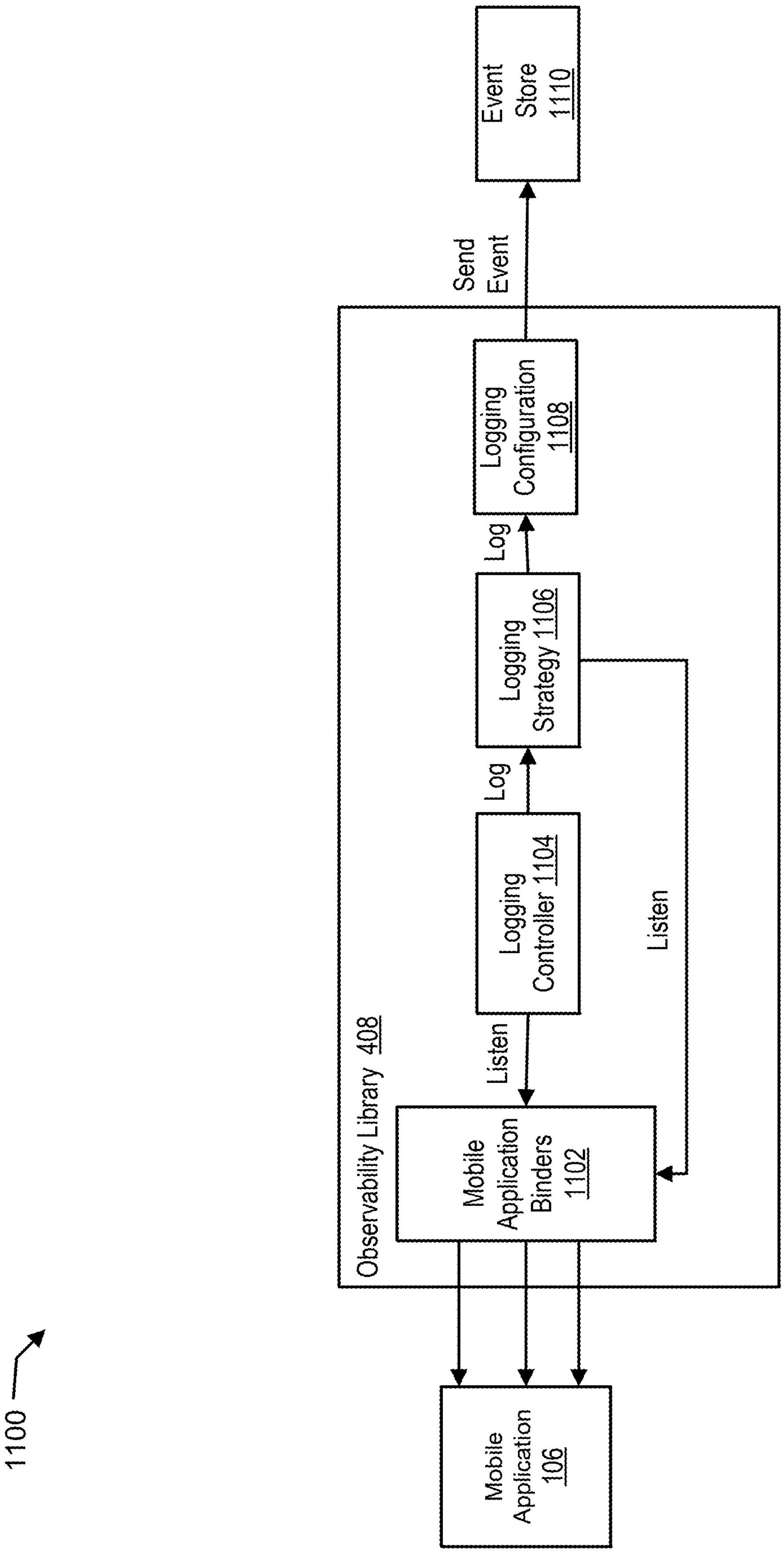
FIG. 11 is an illustration of an example system for implementing a logging strategy, according to one or more embodiments.

FIGS. 11 and 12 are provided to describe logging strategy.

FIG. 11 is an illustration 1100 of an example system for implementing a logging strategy, according to one or more embodiments. The user device 102 can execute a mobile application 106 for collecting state information 108 and event information 110. The mobile application 106 can communicate with the observability service 116 via the mobile application binders (e.g., APIs described in FIGS. 4, 5, and 6.) 1102. The mobile application binders 1102 can listen for external inputs (e.g., event information and event information 110) originating from the user device 102. These inputs can then be passed to the logging controller 1104. The logging controller 1104 can listen to inputs received from the mobile application binders 1102. The logging controller 1104 can further process these inputs and forward them to the logging strategy unit 1106.

The logging strategy unit 1106 can determine how state information 108 and event information 110 are packaged and queued for further processing. This can be configurable based on various parameters such as: (1) battery power: logging can be enabled when the device's battery level exceeds 20% (e.g., on mode). Logging is disabled when the battery level falls below 20% (e.g., off mode) Logging can be on, and the library emits aggregated details of events like log counts per page load when the mobile application determines that events need to be batched (shadow mode). This option may only be available if battery life is above 20%. (2) batching: events can be submitted one-by-one unless multiple events (e.g., dwell events) need to be grouped together. The batching process can adhere to a maximum payload size of 100 KB, and payload size: This limit is derived from the mobile application's maximum size constraint.

After the state information 108 and event information 110 are processed by the logging strategy unit 1106, they are passed to the logging configuration unit 1008, which can determine whether the information is appropriately formatted and prepared for transmission to the event store 1110 for future analysis or retrieval. FIG. 12 is an illustration 1200 of an example table of logging strategy, according to or more embodiments. As illustrated, the logging strategy can include an off strategy, in which information is not collected, an on strategy, in which all logging instruction is turn on, and a shadow strategy, in which all logging instrumentation is turned on, but the library emits aggregated details of events like log counts per page load.

FIG. 13 is an illustration 1300 of a table describing various components, according to one or more movements. As indicated above, a component can be a representation of an attribute or collection of attributes. For illustration purposes, the third row is described. A component can include a click 1302 (e.g., clicking on a widget). The contextual attributes associated with the component can include a context of the click, a type of event, and an event identifier 1306. These attributes can be used by the observability service 116 to draw insights on, for example, dwell time 1308, which can include the amount of time a user spent on a page of the mobile application 106. As used herein, an aggregated attribute can be based on a combination of two or more attributes. The attributes can be derived from one or more components.

Some or all of the process 1400 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 14:
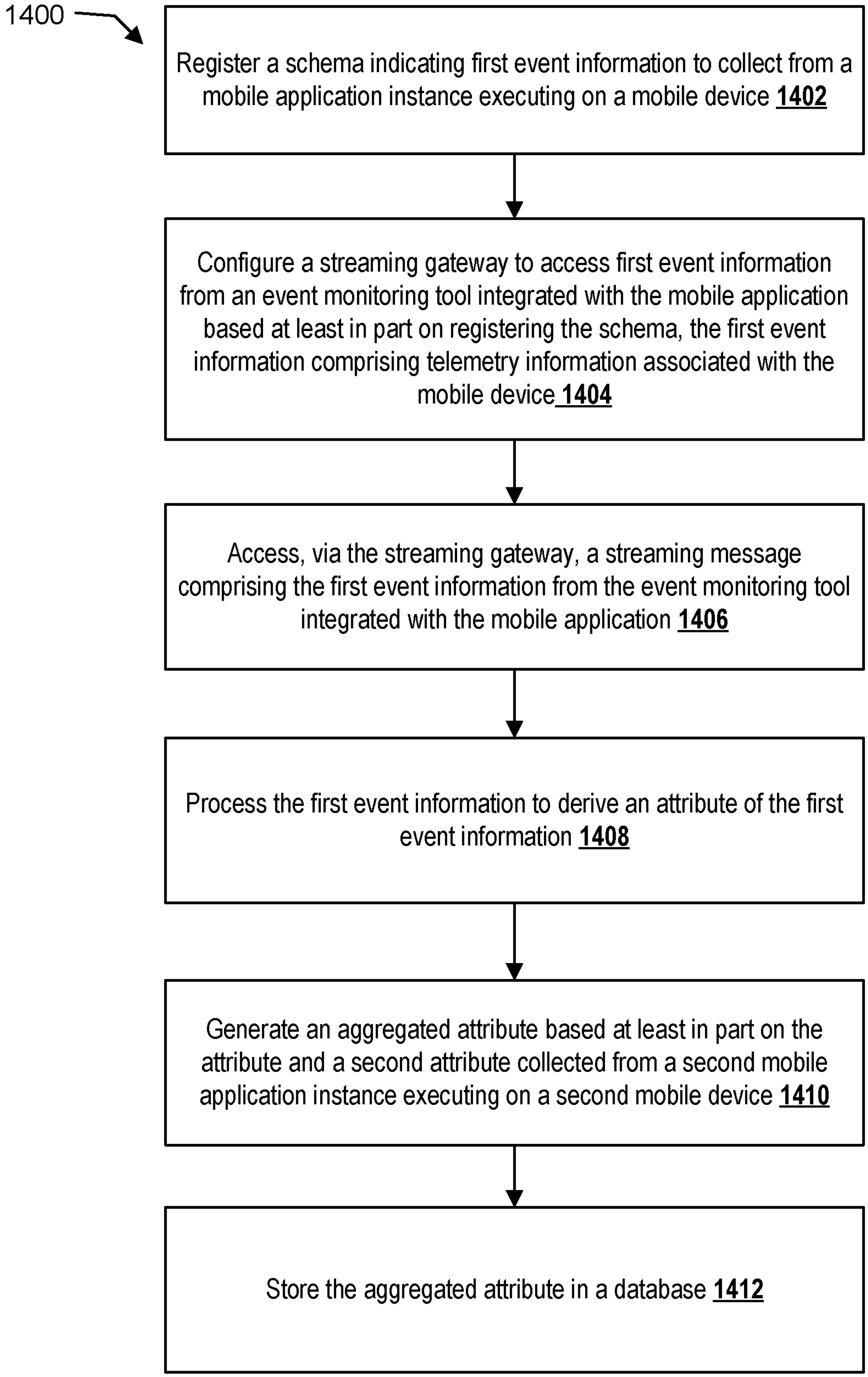
FIG. 14 is a process for collecting event information and state information, according to one or more embodiments.

FIG. 14 is a process 1400 for collecting event information and state information, according to one or more embodiments. At 1402, the process 1400 can include a computing system (e.g., computing system 104) registering a schema (e.g., job 204) indicating first event information to collect from a mobile application instance executing on a mobile device (e.g., user device 102).

In some embodiments, the computing system can access a metadata service, wherein the metadata service manages the schema. The computing system can access the schema based at least in part on accessing the metadata service. The computing system can determine a metadata type indicated by the schema. The computing system can determine metadata associated with the first event information based at least in part on the metadata type. The computing system can add the metadata to the first event information.

In some embodiments, a logging tool for collecting the information is native to the mobile application. In other instances, the computing system can transmit, to the user device, control instructions that include a software developer kit (SDK). The SDK can include instrumentation information for an event type. The control instructions can indicate a mobile application component to be accessed for collecting event information having the event type. The event information can be accessed based at least in part on the event type and the mobile application component.

In some embodiments, the computing system can transmit control instructions to the mobile device for updating a behavior of the mobile application instance (e.g., logging tool). The behavior can include one of an ability to locally turn components on or off or an ability to locally update levels of logging to comprise more event information. For example, the logging tool can dynamically switch to an on mode, an off mode, or a shadow mode based on battery life.

In some embodiments, the computing system can transmit, to the mobile device, configuration information indicating an event type to be collected at the mobile device. The event information is based at least in part on the event type. The computing system can further transmit, to the mobile device, library information indicating an application programming interface (API). The event information is received from the mobile device based at least in part on the application programming interface (API).

At 1404, the process 1400 can include the computing system configuring a streaming gateway (e.g., via streaming gateway unit 206) to access first event information from an event monitoring tool integrated with the mobile application instance based at least in part on the schema, the first event information comprising telemetry information associated with the mobile device.

At 1406, the process 1400 can include the computing system accessing, via the streaming gateway, a streaming message (e.g., input stream 208) comprising the first event information from the event monitoring tool integrated with the mobile application instance;

At 1408, the process 1400 can include the computing system processing the first event information to derive an attribute of the first event information.

In some embodiments, the first event information can be a derivative of a stateful event. In these embodiments, the computing system can determine a stateful event of the mobile application instance based at least in part on the derivative of the stateful event. The computing system can further determine a mobile application state timeline based at least in part on the stateful event, wherein the attribute is derived based at least in part on the application state timeline.

In some embodiments, the computing system can determine a hierarchical structure (e.g., view hierarchy) of a user interface (UI) of the mobile application instance. The computing system can further determine a context of the first event information based at least in part on the hierarchical structure, wherein the attribute is derived based at least in part on the context.

In some embodiments, the computing system can process the first event information, the first event information collected from the mobile application instance by the event monitoring tool; determine that the first event information is the first event information type. The computing system can add the first event information to a data structure based at least in part on the first event information being the first event information type. The computing system can add second event information collected from the mobile application instance by the event monitoring tool to the data structure based at least in part on the second event information being the first event information type. Furthermore, determining the attribute can be based at least in part on the data structure.

At 1410, the process 1400 can include the computing system generating an aggregated attribute based at least in part on the attribute and a second attribute collected from a second mobile application instance executing on a second mobile device.

In some embodiments, the computing system can access a database comprising batched information comprising third event information collected from the mobile application instance, The aggregated attribute is further determined based at least in part on the third event information.

In some embodiments, the computing system can access third event information comprising dwell event information. The computing system can compare a time interval associated with the dwell event information and a threshold time interval. The computing system can determine to exclude the third event information from the aggregated attribute based at least in part on comparing the time interval associated with the dwell event information and the threshold time interval.

At 1412, the process 1400 can include the computing system storing the aggregated attribute in a database. In some embodiments, the computing system can cause an update to source code of the mobile application instance based at least in part on the attribute.

Figure 15:
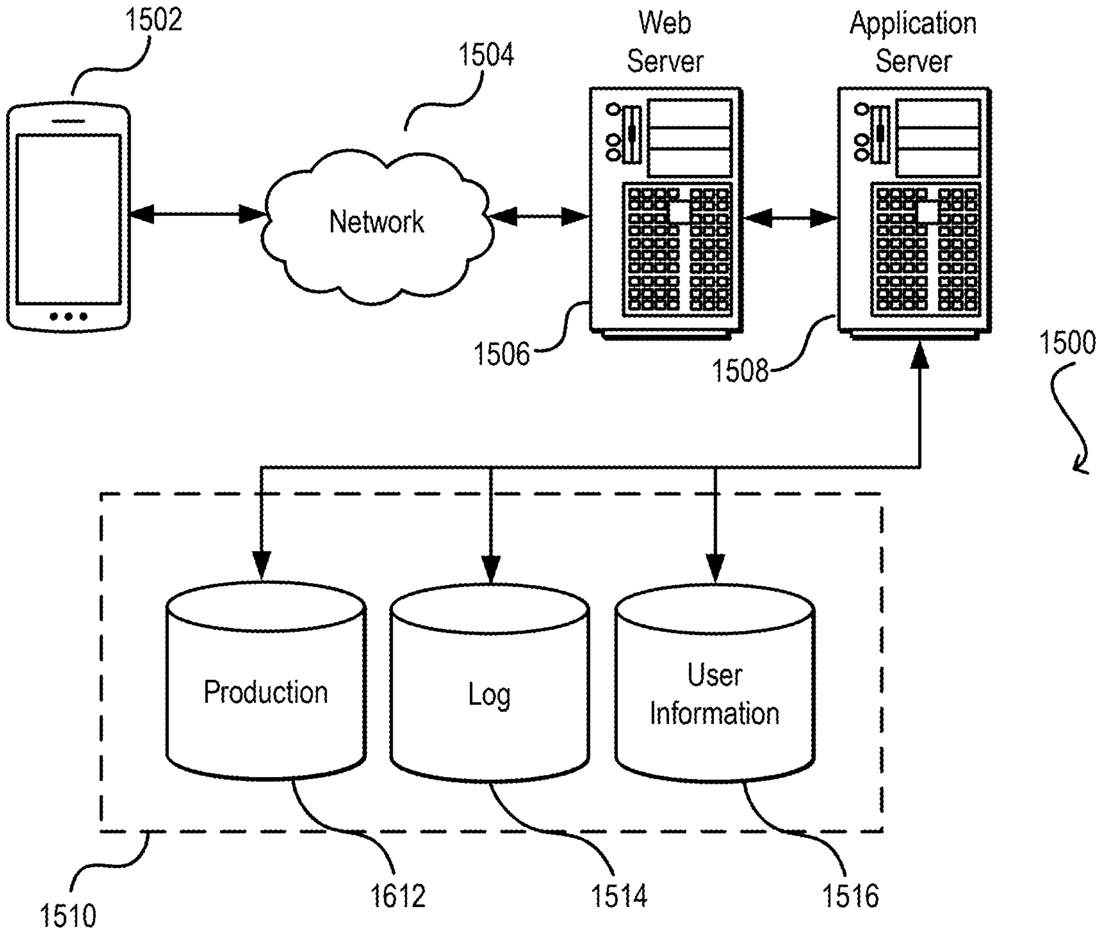
FIG. 15 illustrates an environment in which various embodiments can be implemented.

FIG. 15 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1502, which can include any appropriate device operable to send and receive requests, messages, or information over an appropriate network 1504 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1510. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1502 and the application server 1508, can be handled by the Web server. It should be understood that the Web and application servers are not required and are merely example components, as structured code discussed herein can be executed on any appropriate device or host machine as discussed elsewhere herein.

The data store 1510 can include several separate data tables, databases or other data storage mechanisms and media for storing data relating to a particular aspect. For example, the data store illustrated includes mechanisms for storing production data 1512 and user information 1516, which can be used to serve content for the production side. The data store also is shown to include a mechanism for storing log data 1514, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1510. The data store 1510 is operable, through logic associated therewith, to receive instructions from the application server 1508 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1502. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 1500 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

registering a schema indicating first event information to collect from a mobile application instance executing on a first mobile device;

configuring a streaming gateway to access the first event information from a logging tool integrated with the mobile application instance based at least in part on registering the schema;

transmitting, to the first mobile device, configuration information indicating a first event information type for collecting by the logging tool from a component of the mobile application instance;

accessing, via the streaming gateway, a streaming message comprising the first event information from an event monitoring tool integrated with the mobile application instance;

generating a data structure comprising the first event information and second event information;

processing the data structure to derive a first attribute based at least in part on the first event information;

generating an aggregated attribute based at least in part on the first attribute and a second attribute collected from a second mobile application instance executing on a second mobile device; and storing the aggregated attribute in a database.

2. The computer-implemented method of claim 1, wherein the method further comprises:

accessing, via the streaming gateway, state information collected from the mobile application instance; and determining a correlation between the first event information and the state information, wherein the first attribute is further based at least in part on the correlation.

3. The computer-implemented method of claim 1, wherein the method further comprises:

processing feedback information generated based at least in part on the aggregated attribute; and causing an update to source code of the mobile application instance based at least in part on the aggregated attribute.

4. A computing system comprising:

one or more processors; and one or more computer-readable media having stored thereon instructions that, when executed, cause the one or more processors to:

register a schema indicating first event information to collect from a mobile application instance executing on a first mobile device;

configure a streaming gateway to access the first event information from an event monitoring tool integrated with the mobile application instance based at least in part on the schema, the first event information comprising telemetry information associated with the first mobile device;

access, via the streaming gateway, a streaming message comprising the first event information from the event monitoring tool integrated with the mobile application instance;

process the first event information to derive a first attribute of the first event information;

generate an aggregated attribute based at least in part on the first attribute and a second attribute collected from a second mobile application instance executing on a second mobile device; and store the aggregated attribute in a database.

5. The computing system of claim 4, wherein the instructions that, when executed, further cause the one or more processors to:

cause an update to source code of the mobile application instance based at least in part on the aggregated attribute.

6. The computing system of claim 4, wherein the instructions that, when executed, further cause the one or more processors to:

transmit control instructions to the first mobile device for updating a behavior of the mobile application instance, the behavior comprising one of an ability to locally turn components on or off or an ability to locally update levels of logging to comprise more event information.

7. The computing system of claim 4, wherein the instructions that, when executed, further cause the one or more processors to:

transmit, to the first mobile device, configuration information indicating an event type to be collected at the first mobile device, wherein the first event information is based at least in part on the event type; and transmit, to the first mobile device, library information indicating an application programming interface (API), wherein the first event information is received from the first mobile device based at least in part on the application programming interface (API).

8. The computing system of claim 4, wherein the first event information comprising a derivative of a stateful event, and wherein the instructions that, when executed, further cause the one or more processors to:

determine a stateful event of the mobile application instance based at least in part on the derivative of the stateful event; and determine a mobile application state timeline based at least in part on the stateful event, wherein the first attribute is derived based at least in part on the mobile application state timeline.

9. The computing system of claim 4, wherein the instructions that, when executed, further cause the one or more processors to:

determine a hierarchical structure of a user interface (UI) of the mobile application instance; and determine a context of the first event information based at least in part on the hierarchical structure, wherein the first attribute is derived based at least in part on the context.

10. The computing system of claim 4, wherein the instructions that, when executed, further cause the one or more processors to:

transmit, to the first mobile device, control instructions comprising a software developer kit (SDK), wherein the SDK comprises instrumentation information for an event type, wherein the control instructions indicate a mobile application component to be accessed for collecting event information having the event type, and wherein the event information is access based at least in part on the event type and the mobile application component.

11. The computing system of claim 4, wherein the instructions that, when executed, further cause the one or more processors to:

access a database comprising batched information comprising third event information collected from the mobile application instance, wherein the aggregated attribute is further determined based at least in part on the third event information.

12. The computing system of claim 4, wherein the instructions that, when executed, further cause the one or more processors to:

access third event information comprising dwell event information;

compare a time interval associated with the dwell event information and a threshold time interval; and determine to exclude the third event information from the aggregated attribute based at least in part on comparing the time interval associated with the dwell event information and the threshold time interval.

13. The computing system of claim 4, wherein the instructions that, when executed, further cause the one or more processors to:

access a metadata service, wherein the metadata service manages the schema; and access the schema based at least in part on accessing the metadata service.

14. The computing system of claim 4, wherein the instructions that, when executed, further cause the one or more processors to:

determine a metadata type indicated by the schema;

determine metadata associated with the first event information based at least in part on the metadata type; and add the metadata to the first event information.

15. The computing system of claim 4, wherein the instructions that, when executed, further cause the one or more processors to:

process the first event information, the first event information collected from the mobile application instance by the event monitoring tool;

determine that the first event information is a first event information type;

add the first event information to a data structure based at least in part on the first event information being the first event information type; and add second event information collected from the mobile application instance by the event monitoring tool to the data structure based at least in part on the second event information being the first event information type, wherein deriving the first attribute is based at least in part on the data structure.

16. One or more non-transitory-computer-readable media having stored thereon instructions that, when executed, cause a first mobile device to:

process configuration information indicating first event information type to be collected from a mobile application instance executing at the first mobile device;

register a mobile application component for collecting the first event information based at least in part on the configuration information and the first event information type;

connect with a streaming gateway for transmitting the first event information to a server;

monitor, via a logging tool, the mobile application component for the first event information; and transmit, via the streaming gateway, a message comprising the first event information to the server, wherein the first event information is configured for processing by the server to derive a first attribute of the first event information and to generate an aggregated attribute based at least in part on the first attribute and a second attribute collected from a second mobile instance executing on a second mobile device.

17. The one or more non-transitory-computer-readable media of claim 16, wherein the instructions that when executed further cause the first mobile device to:

request identification of a mobile application widget for monitoring for first event information; and register the mobile application widget for monitoring by the logging tool based at least in part on the identification, wherein the first event information further comprises information associated with the mobile application widget.

18. The one or more non-transitory-computer-readable media of claim 16, wherein the instructions that when executed further cause the first mobile device to:

process configuration information indicating an ability to update a level of logging based on a trigger;

determine, while monitoring the mobile application instance for the first event information, the trigger; and update the level of logging based at least in part on the trigger.

19. The one or more non-transitory-computer-readable media of claim 16, wherein the configuration information further indicates a second event information type to collected from the mobile application instance, and wherein the instructions that when executed further cause the first mobile device to:

determine that the logging tool is collecting first event information and second event information, the second event information being the second event information type, the first event information collected from a first mobile application component, the second event information collected from a second mobile application component; and determine to stop collecting information from the second mobile application component based on the configuration information.

20. The one or more non-transitory-computer-readable media of claim 16, wherein the instructions that when executed further cause the first mobile device to:

process supplemental configuration information indicating a time interval for the logging tool to log the first event information, wherein the logging tool monitors the mobile application instance based at least in part on the logging tool.

* * * * *